(12) United States Patent
Sato (10) Patent No.: US 12,348,163 B2
(45) Date of Patent: Jul. 1, 2025

(54) MOTOR DRIVE DEVICE AND MOTOR

(71) Applicant: Panasonic Intellectual Property Management Co., Ltd., Osaka (JP)

(72) Inventor: Daisuke Sato, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 184 days.

(21) Appl. No.: 18/249,987

(22) PCT Filed: Oct. 28, 2021

(86) PCT No.: PCT/JP2021/039815
§ 371 (c)(1),
(2) Date: Apr. 21, 2023

(87) PCT Pub. No.: WO2022/130797
PCT Pub. Date: Jun. 23, 2022

(65) Prior Publication Data
US 2023/0387844 A1    Nov. 30, 2023

(30) Foreign Application Priority Data
Dec. 14, 2020 (JP) .................... 2020-206858

(51) Int. Cl.
H02P 21/18 (2016.01)
H02P 21/22 (2016.01)
H02P 27/08 (2006.01)

(52) U.S. Cl.
CPC .............. *H02P 21/18* (2016.02); *H02P 21/22* (2016.02); *H02P 27/08* (2013.01)

(58) Field of Classification Search
CPC ........ H02P 6/16; H02P 21/146; H02P 25/023; H02P 27/06; H02P 31/00; H02P 6/06;
(Continued)

(56) References Cited

U.S. PATENT DOCUMENTS

| | | | |
|---|---|---|---|
| 2014/0001999 A1* | 1/2014 | Sato | B60L 50/15 318/503 |
| 2014/0257574 A1 | 9/2014 | Sato | |
| 2018/0032047 A1 | 2/2018 | Nishizono et al. | |

FOREIGN PATENT DOCUMENTS

JP    2013-046488    3/2013

OTHER PUBLICATIONS

The EPC Office Action dated May 10, 2024 for the related European Patent Application No. 21906161.1.
(Continued)

*Primary Examiner* — Said Bouziane
(74) *Attorney, Agent, or Firm* — Rimon P.C.

(57) ABSTRACT

A motor driver includes an operation clock generator, a PWM signal detector that detects a PWM signal indicating a target rotation speed input from an outside in a first cycle based on a clock from the operation clock generator, a target rotation speed converter that converts a duty ratio of the detected PWM signal into the target rotation speed, a rotation speed controller that drives the motor so that an actual rotation speed of the motor matches the target rotation speed, a trigger value calculator that calculates a second cycle based on a difference between a cycle of the PWM signal and the first cycle, and a timer that generates a trigger signal in the calculated second cycle. The rotation speed controller calculates the actual rotation speed depending on the second cycle of the trigger signal generated by the timer.

4 Claims, 7 Drawing Sheets

(58) Field of Classification Search
CPC .... H02P 9/009; B60L 15/20; B60L 2240/421; B60L 3/0038
See application file for complete search history.

(56) References Cited

OTHER PUBLICATIONS

International Search Report of PCT application No. PCT/JP2021/039815 dated Dec. 28, 2021.

\* cited by examiner

MOTOR DRIVE DEVICE AND MOTOR

CROSS-REFERENCE TO RELATED APPLICATIONS

This application is a U.S. national stage application of the PCT International Application No. PCT/JP2021/039815 filed on Oct. 28, 2021, which claims the benefit of foreign priority of Japanese patent application 2020-206858 filed on Dec. 14, 2020, the contents all of which are incorporated herein by reference.

TECHNICAL FIELD

The present disclosure relates to a motor driver and a motor including the motor driver.

BACKGROUND ART

A hybrid vehicle or an electric vehicle is equipped with a large battery in order to drive the vehicle itself. In order to cool a circuit of a hybrid vehicle or an electric vehicle, a blower which is a motor including an impeller (impeller) is mounted. Cooling performance (air volume) required at each time is determined in accordance with a traveling state of the vehicle, such as a current value flowing through the circuit. A hybrid vehicle or an electric vehicle needs to control a blower to satisfy cooling performance. The variation in cooling performance depends on the blower. The variation in cooling performance greatly affects, among others, the variation in rotation speed of the impeller. The rotation speed error of the blower is greatly affected by the clock accuracy of the operation clock generator included in the motor driver that drives the motor included in the blower. However, in a case where a highly accurate operation clock generator such as a crystal oscillator is used, the cost increases.

Therefore, conventionally, there has been proposed a motor driver capable of suppressing an error in the actual rotation speed to be detected even when an operation clock generator with low accuracy is used (see, for example, PTL 1).

In PTL 1, in a motor driver to which a target rotation speed is given using a duty ratio of a pulse width modulation (PWM) signal input from a higher level system, a cycle error of the PWM signal is calculated based on a clock from an operation clock generator with low accuracy, and a rotor rotation speed calculated from a position detection sensor is multiplied and corrected based on the cycle error to perform speed control. Accordingly, an error of the detected actual rotation speed is suppressed.

However, the technique of PTL 1 is a method of multiplying the variation value of the rotor rotation speed calculated from the position detection sensor by the variation value of the cycle error. For this reason, the error of the detected actual rotation speed may not be sufficiently suppressed depending on the values of the rotor error (that is, a possible situation).

CITATION LIST

Patent Literature

PTL 1: Unexamined Japanese Patent Publication No. 2013-46488

SUMMARY

Therefore, an object of the present disclosure is to provide a motor driver capable of reliably suppressing an error in the detected actual rotation speed although the motor driver includes an operation clock generator with low accuracy, and a motor including the motor driver.

In order to achieve the above object, a motor driver according to an exemplary embodiment of the present disclosure is a motor driver that rotates a motor at a target rotation speed, the motor driver including:

an operation clock generator that generates a clock;

a pulse width modulation (PWM) signal detector that detects a pulse width modulation signal indicating the target rotation speed, the pulse width modulation signal being repeatedly input from an outside in a first cycle, based on the clock generated by the operation clock generator;

a target rotation speed converter that converts a duty ratio of the pulse width modulation signal detected by the PWM signal detector into a target rotation speed;

a rotation speed controller that calculates an actual rotation speed of the motor by detecting a state related to rotation of the motor, and drives the motor to cause the calculated actual rotation speed to match the target rotation speed converted by the target rotation speed converter;

a PWM cycle detector that detects a cycle of the pulse width modulation signal detected by the PWM signal detector;

a PWM cycle error calculator that calculates a difference between the cycle detected by the PWM cycle detector and the first cycle;

a trigger value calculator that calculates a second cycle when the trigger signal is repeatedly generated based on the difference calculated by the PWM cycle error calculator; and a timer that generates a trigger signal in the second cycle calculated by the trigger value calculator, in which the rotation speed controller calculates the actual rotation speed depending on the second cycle of the trigger signal generated by the timer.

The rotation speed controller may calculate a rotation angle of the motor in the second cycle of the trigger signal generated by the timer as the actual rotation speed.

The rotation speed controller may calculate the actual rotation speed in interruption processing started with the trigger signal generated by the timer as a trigger.

In order to achieve the above object, a motor according to an exemplary embodiment of the present disclosure is a motor including the motor driver and a stator to which a drive current is supplied based on a result calculated by the motor driver.

According to the present disclosure, a motor driver capable of reliably suppressing an error of an actual rotation speed to be detected despite including an operation clock generator with low accuracy, and a motor including the motor driver are realized.

DESCRIPTION OF PREFERRED EMBODIMENTS

Hereinafter, exemplary embodiments of the present disclosure will be described in detail with reference to the drawings. Note that each of the exemplary embodiments described below illustrates a specific example of the present disclosure. Numerical values, shapes, materials, components, arrangement positions and connection modes of the components, steps, an order of the steps, and the like shown in the following exemplary embodiment are examples only, and are not intended to limit the present disclosure. Each of the drawings is not necessarily strictly illustrated. In each of the drawings, substantially the same components are designated by the same reference numerals, and overlapping description will be omitted or simplified.

Figure 1:
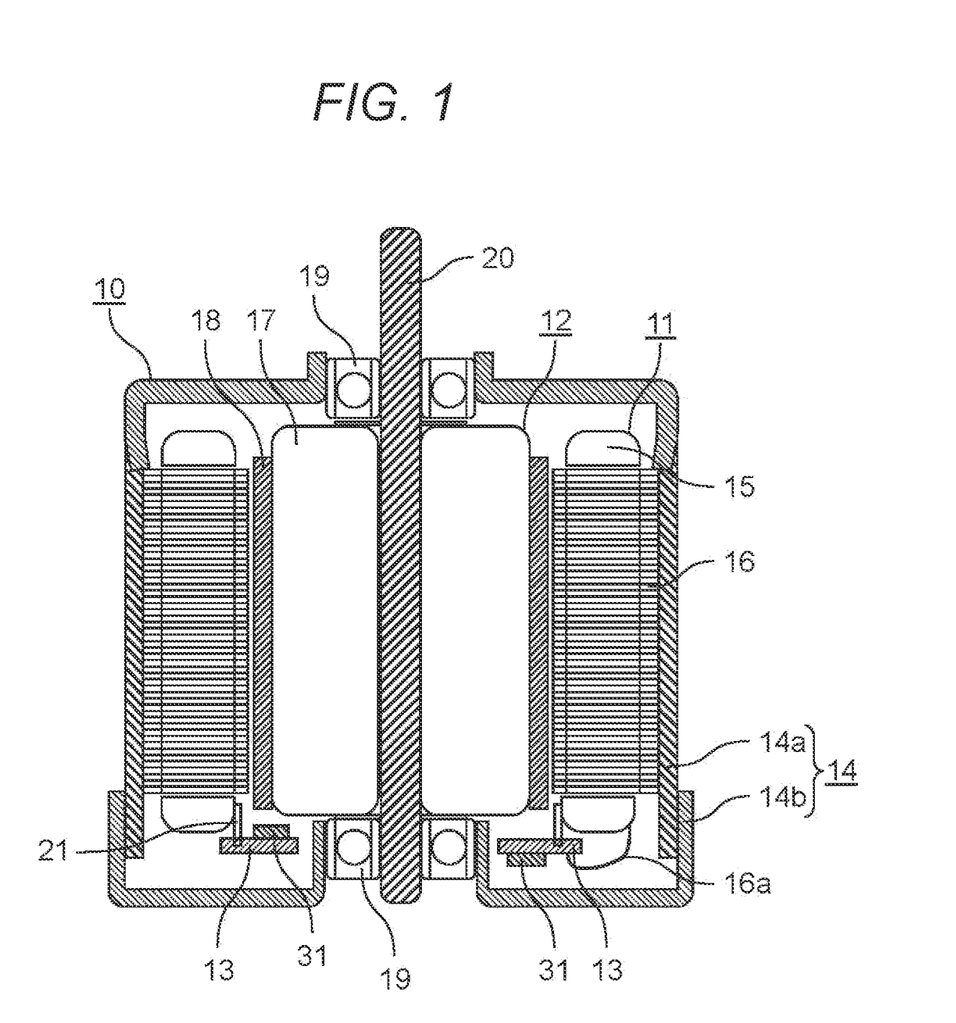
FIG. 1 is a diagram illustrating a structure of a motor included in a blower according to an exemplary embodiment.

FIG. 1 is a diagram illustrating a structure of motor 10 included in a blower according to an exemplary embodiment. In the present exemplary embodiment, as motor 10, an example of an inner rotor type brushless motor in which a rotor is rotatably disposed on an inner peripheral side of a stator will be described. Motor 10 has windings of a plurality of phases. Motor 10 rotates by being driven by a signal in which each phase is subjected to pulse width modulation (PWM).

As illustrated in FIG. 1, motor 10 includes stator 11, rotor 12, circuit board 13, and motor case 14. Motor case 14 is formed of a sealed cylindrical metal. Motor 10 has a configuration in which stator 11, rotor 12, and circuit board 13 are housed in such motor case 14. Motor case 14 includes case body 14a and case lid 14b. When case lid 14b is attached to case body 14a, motor case 14 is substantially sealed.

In FIG. 1, stator 11 is configured by winding 16 for each phase around stator iron core 15. In the present exemplary embodiment, an example in which winding 16 divided into three phases of a U-phase, a V-phase, and a W-phase having phases different from each other by 120 degrees is wound around stator iron core 15 will be described. Stator iron core 15 has a plurality of salient poles protruding toward the inner peripheral side. The outer peripheral side of stator iron core 15 has a substantially cylindrical shape. The outer periphery of stator iron core 15 is fixed to case body 14a.

Rotor 12 is inserted inside stator 11 via a gap. Rotor 12 holds cylindrical permanent magnet 18 on the outer periphery of rotor frame 17. Rotor 12 is disposed so as to be rotatable about rotation shaft 20 supported by bearing 19. That is, the distal end surface of the salient pole of stator iron core 15 and the outer peripheral surface of permanent magnet 18 are arranged to face each other.

In motor 10, circuit board 13 on which various circuit components 31 are mounted is built in motor case 14. These circuit components 31 constitute a motor driver for controlling and driving motor 10. Support member 21 is attached to stator iron core 15, Circuit board 13 is fixed in motor case 14 via support member 21. End portions of windings 16 of the U phase, the V phase, and the W phase are drawn out from stator 11 as lead wires 16a. Each lead wire 16a is connected to circuit board 13.

In order to achieve such a configuration, first, stator 11 is inserted into case body 14a and fixed to the inner surface of case body 14a. Next, rotor 12 and circuit board 13 are housed inside case body 14a. Thereafter, case lid 14b is mounted on case body 14a. In this procedure, motor 10 incorporating the motor driver is formed.

Note that motor 10 and the motor driver may be integrated. Motor case 14 is made of metal. This has a shielding effect, so that electromagnetic noise radiated from circuit board 13, stator 11, and the like to the outside can be suppressed. In addition, stator iron core 15 is directly fixed to case body 14a. Therefore, the heat generated in stator 11 can be dissipated to the outside through the metal motor case 14.

A power supply voltage and a control signal are supplied from the outside to motor 10 configured as described above. As a result, a drive current flows through winding 16 by the motor driver realized by circuit board 13, and a magnetic field is generated from stator iron core 15. The magnetic field from stator iron core 15 and the magnetic field from permanent magnet 18 generate attraction and repulsion according to the polarity of the magnetic fields. These forces rotate rotor 12 about the rotation shaft 20.

The present exemplary embodiment has been described using the inner rotor brushless motor as described above. However, the present disclosure can also be applied to an outer rotor type. Further, the present disclosure can also be applied to all rotor rotary motors such as brush-equipped motors. A blower used for air cooling or the like is configured by attaching an impeller for air blowing to the rotation shaft 20 of motor 10.

Next, a motor driver of the present exemplary embodiment configured by circuit component 31 mounted on circuit board 13 will be described.

Figure 2:
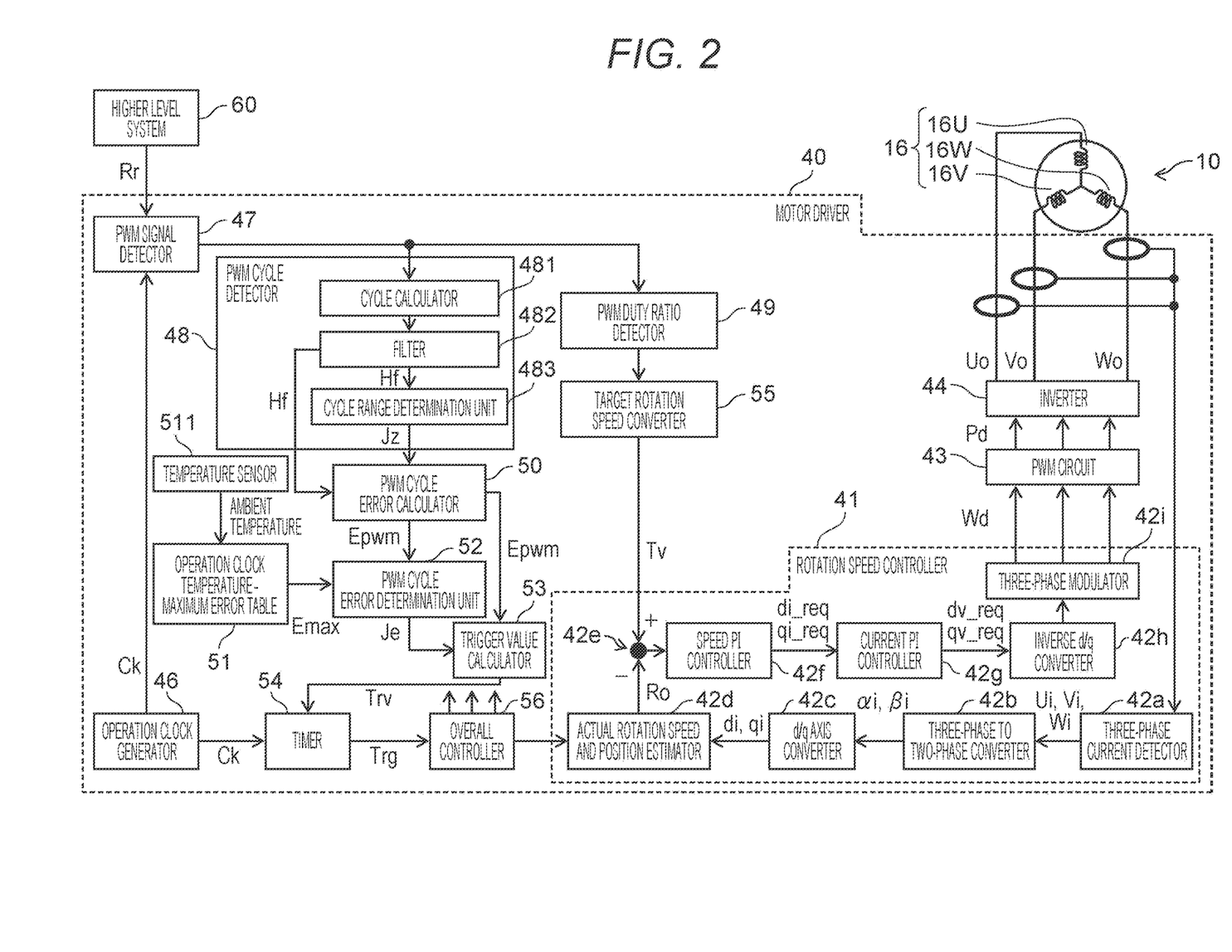
FIG. 2 is a block diagram of a motor driver incorporated in a motor according to the exemplary embodiment.

FIG. 2 is a block diagram of motor driver 40 incorporated in motor 10 according to the exemplary embodiment. Motor driver 40 includes rotation speed controller 41, PWM circuit 43, inverter 44, operation clock generator 46, PWM signal detector 47, PWM cycle detector 48, PWM duty ratio detector 49, PWM cycle error calculator 50, operation clock temperature-maximum error table 51, temperature sensor 511, PWM cycle error determination unit 52, trigger value calculator 53, timer 54, target rotation speed converter and overall controller 56.

Pulse width modulation (PWM) signal Rr is repeatedly input from external higher level system 60 to motor driver 40 in a first cycle as a command signal indicating a target rotation speed. PWM signal RT is, for example, a PWM signal indicating a rotation speed (rpm) per minute with a duty ratio. The first cycle is, for example, a cycle (2 msec) corresponding to 500 Hz.

Operation clock generator 46 is a circuit that generates clock signal Ck having a constant frequency (for example, 20 kHz). In order to prioritize cost, operation clock generator 46 is implemented by a simple circuit (for example, a clock circuit, an RC oscillation circuit, and the like incorporated in a microcontroller included in motor driver Therefore, operation clock generator 46 is inferior in accuracy and temperature dependency to higher level system 60.

PWM signal detector 47 and tinier 54 detect PWM signal Rr and generate trigger signal Trg for starting the interruption processing for the rotation speed control by rotation speed controller 41 based on clock signal Ck from operation clock generator 46.

More specifically, PWM signal detector 47 counts the time widths of signal level High and signal level Low of input PWM signal Rr using clock signal Ck from operation clock generator 46 provided in the blower. Both the count values are notified to PWM cycle detector 48 and PWM duty ratio detector 49. PWM duty ratio detector 49 calculates the duty ratio using the count value from PWM signal detector 47. Target rotation speed converter 55 converts the duty ratio notified from PWM duty ratio detector 49 into a target rotation speed, and outputs a command signal Tv indicating the converted target rotation speed. In order to perform the counting operation as described above, the frequency of clock signal Ck is set to a frequency (for example, 20 kHz) sufficiently higher than the frequency (for example, 500 Hz) of the PWM signal.

Here, normally, higher level system 60 is operated by a high-accuracy clock using, for example, a crystal oscillator. Therefore, the first cycle in the repetition of PWM signal Rr supplied from higher level system 60 also has high accuracy. On the other hand, as described above, the clock accuracy of operation clock generator 46 included in motor driver 40 is generally low, and the frequency variation due to the temperature is also larger than that of higher level system 60. Although described in detail below, operation clock generator 46 uses the first cycle of the high-accuracy PWM signal Rr supplied from higher level system 60 and avoids multiplication of the signal level variation value and the variation value, thereby reliably securing the accuracy of the rotation speed.

PWM cycle detector 48 is a processor that detects a cycle of PWM signal Rr detected by PWM signal detector 47. PWM cycle detector 48 includes cycle calculator 481, filter 482, and cycle range determination unit 483. Based on the count value from PWM signal detector 47, cycle calculator 481 calculates a PWM cycle Obtained by adding the time width of the high level and the time width of the low level of PWM signal Rr, and both the time widths. Filter 482 performs processing of removing noise on the PWM cycle calculated by cycle calculator 481, and then outputs PWM cycle Hf to cycle range determination unit 483 and PWM cycle error calculator 50. For example, filter 482 is a low-pass filter or an averaging filter for preventing a sudden change in the PWM cycle due to noise or the like. Cycle range determination unit 483 determines whether PWM cycle Hf is at a noise level, and outputs the determination result as acceptable/unacceptable signal Jz to PWM cycle error calculator 50.

PWM cycle error calculator 50 calculates cycle error Epwm indicating a degree of a difference between a predetermined cycle (here, the first cycle which is an ideal cycle of PWM signal Rr output from higher level system 60) and PWM cycle Hf detected by PWM cycle detector 48. PWM cycle error calculator 50 outputs calculated cycle error Epwm to PWM cycle error determination unit 52 and trigger value calculator 53. Specifically, PWM cycle error calculator 50 calculates and outputs the error ratio (that is, PWM cycle Hf/first cycle) as cycle error Epwm. However, when the signal Jz from cycle range determination unit 483 is determined to be unacceptable, that is, the noise level, PWM cycle error calculator 50 outputs the previous cycle error Epwm.

Figure 3:
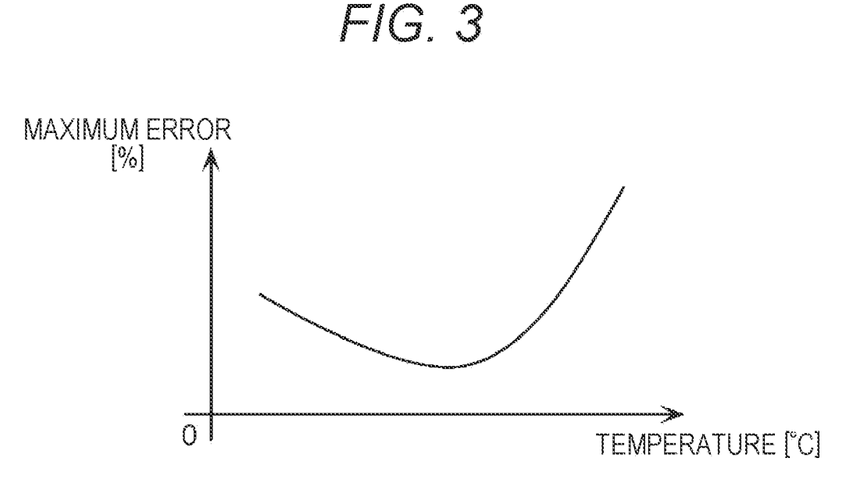
FIG. 3 is a diagram illustrating an example of an operation clock temperature-maximum error table in FIG. 2.

FIG. 3 is a diagram illustrating an example of operation clock temperature-maximum error table 51 of FIG. 2. FIG. 3 illustrates a relationship between a temperature around a generation location of an operation clock provided in the blower and a maximum error. Operation clock temperature-maximum error table 51 acquires the ambient temperature from temperature sensor 511 and derives maximum error Emax of the operation clock provided in motor 10 at the acquired ambient temperature. Operation clock temperature-maximum error table 51 is, for example, a lookup table configured by a memory.

Referring to FIG. 2, PWM cycle error determination unit 52 compares maximum error Emax of the operation clock acquired from operation clock temperature-maximum error table 51 with cycle error Epwm of PWM signal Rr calculated by PWM cycle error calculator 50. PWM cycle error determination unit 52 outputs error determination signal Je indicating the result.

Trigger value calculator 53 uses error determination signal Je from PWM cycle error determination unit 52 and cycle error Epwm from PWM cycle error calculator 50 to calculate a second cycle (that is, the preset count value (trigger value) that causes timer 54 to output trigger signal Trg) that is a cycle when trigger signal Trg is repeatedly generated. Trigger value calculator 53 outputs trigger value signal Trv indicating the calculated second cycle to timer 54. That is, when error determination signal Je from PWM cycle error determination unit 52 indicates that cycle error Epwm of PWM signal Rr is smaller than maximum error Emax of the operation clock, trigger value calculator 53 determines that the error is within the correctable range. Trigger value calculator 53 calculates a second cycle for correcting cycle error Epwm. Trigger value calculator 53 outputs trigger value signal Trv indicating the calculated second cycle to timer 54. Specifically, as the calculation of the second cycle, trigger value calculator 53 multiplies a fixed reference value, that is, a reference value of a preset count value (trigger value) corresponding to an ideal state in which no error occurs in clock signal Ck from operation clock generator 46 by an error ratio indicated by cycle error Epwm. As a result, trigger value calculator 53 calculates the second cycle.

Timer 54 counts clock signal Ck of operation clock generator 46, and when the obtained count value reaches a preset count value of the second cycle (trigger value) indicated by trigger value signal Trv from trigger value calculator 53, repeatedly outputs trigger signal Trg for starting the interruption processing by rotation speed controller 41 to overall controller 56. Timer 54 is an up-down counter circuit with a preset function that repeats up-counting from 0 to a preset count value and then down-counting from the preset count value to 0.

When trigger signal Trg is input from timer 54, overall controller 56 activates rotation speed controller 41 or executes processing when an abnormality is detected in motor driver 40 as interruption processing. In this manner, overall controller 56 executes the overall processing in motor driver 40.

Rotation speed controller 41 executes an interruption processing activated by overall controller 56 using trigger signal Trg generated by timer 54 as a trigger. The interruption processing is rotation speed control as feedback control for calculating the actual rotation speed of motor 10 (=rotation angle/unit time) by detecting a state (that is, the rotation angle) related to the rotation of motor 10 in the unit time with the cycle (this is the second cycle and can also be referred to as an "interruption cycle") of trigger signal Trg repeatedly generated from timer 54 as the unit time, and driving motor 10 so that the calculated actual rotation speed coincides with the target rotation speed converted by target rotation speed converter 55. For this purpose, rotation speed controller 41 includes three-phase current detector 42a, three-phase to two-phase converter 42b, dig axis converter 42c, actual rotation speed and position estimator 42d, differentiator 42e, speed PI controller 42f, current PI controller 42g, inverse d/q converter 42h, and three-phase modulator 42i.

Three-phase current detector 42a is an example of a sensor that detects a state related to rotation of motor 10. Three-phase current detector 42a is a sensor coil that detects a current flowing through each of U-phase winding 16U, V-phase winding 16V, and W-phase winding 16W. Three-phase current detector 42a is less expensive than the Hall sensor, Three-phase to two-phase converter 42b converts (that is, Clarke transformation) U-phase, V-phase, and W-phase three-phase current signals Ui, Vi, and Wi detected by three-phase current detector 42a into two-phase current signals αi and βi in the orthogonal coordinate system. d/q axis converter 42c converts (that is, the Park transformation) two-phase current signals αi and βi from three-phase to two-phase converter 42b into current signals di and qi in the rotating coordinate system. Actual rotation speed and position estimator 42d calculates the actual rotation speed and the position (that is, the actual rotation speed in decimal point precision, that is, the "actual rotation speed and position" is also simply referred to as the "actual rotation speed") of motor 10 from current signals di and qi from d/q axis converter 42c. Actual rotation speed and position estimator 42d outputs an actual rotation speed and position signal Ro indicating the calculated actual rotation speed. Differentiator 42e calculates a difference between the actual rotation speed indicated by actual rotation speed and position signal Ro from actual rotation speed and position estimator 42d and the target rotation speed indicated by command signal Tv from target rotation speed converter 55.

Speed PI controller 42f calculates current signals di_req and qi_req in the rotating coordinate system for PI control (control by proportional operation and integral operation) of the speed of motor 10 so that the difference calculated by differentiator 42e approaches Current PI controller 42g converts current signals di_req and qi_req from speed PI controller 42f into voltage signals dv_req and qv_req. Inverse dig converter 42h performs inverse Park transformation on voltage signals dv_req and qv_req from current PI controller 42g to convert the signals into two-phase signals in the orthogonal coordinate system. Three-phase modulator 42i converts the two-phase signal from inverse d/q converter 42h into three-phase waveform signal Wd by performing inverse Clarke transformation.

PWM circuit 43 calculates a PWM duty ratio. That is, PWM circuit 43 generates three-phase driving PWM signal Pd by performing pulse width modulation (PWM) using three-phase waveform signal Wd from three-phase modulator 42i as a modulation signal. Inverter 44 converts the DC voltage into three-phase AC voltages Uo, Vo, and Wo according to three-phase driving PWM signal Pd from PWM circuit 43, and applies the DC voltages to windings 16U, 16V, and 16W, respectively. Inverter 44 includes, for example, a plurality of switching elements such as transistors.

Note that rotation speed controller 41, PWM circuit 43, inverter 44, operation clock generator 46, PWM signal detector 47, PWM cycle detector 48 PWM duty ratio detector 49, PWM cycle error calculator 50, operation clock temperature-maximum error table 51, PWM cycle error determination unit 52, trigger value calculator 53, timer 54, target rotation speed converter 55, and overall controller 56 constituting motor driver 40 are not limited to the above-described circuit examples. The program may be realized as hardware by a logic circuit using a field programmable gate array (FPGA) or the like, or may be realized as software by a memory storing a program and a processor such as a microcontroller executing the program.

Next, operation of motor driver 40 according to the present exemplary embodiment configured as described above will be described.

Figure 4:
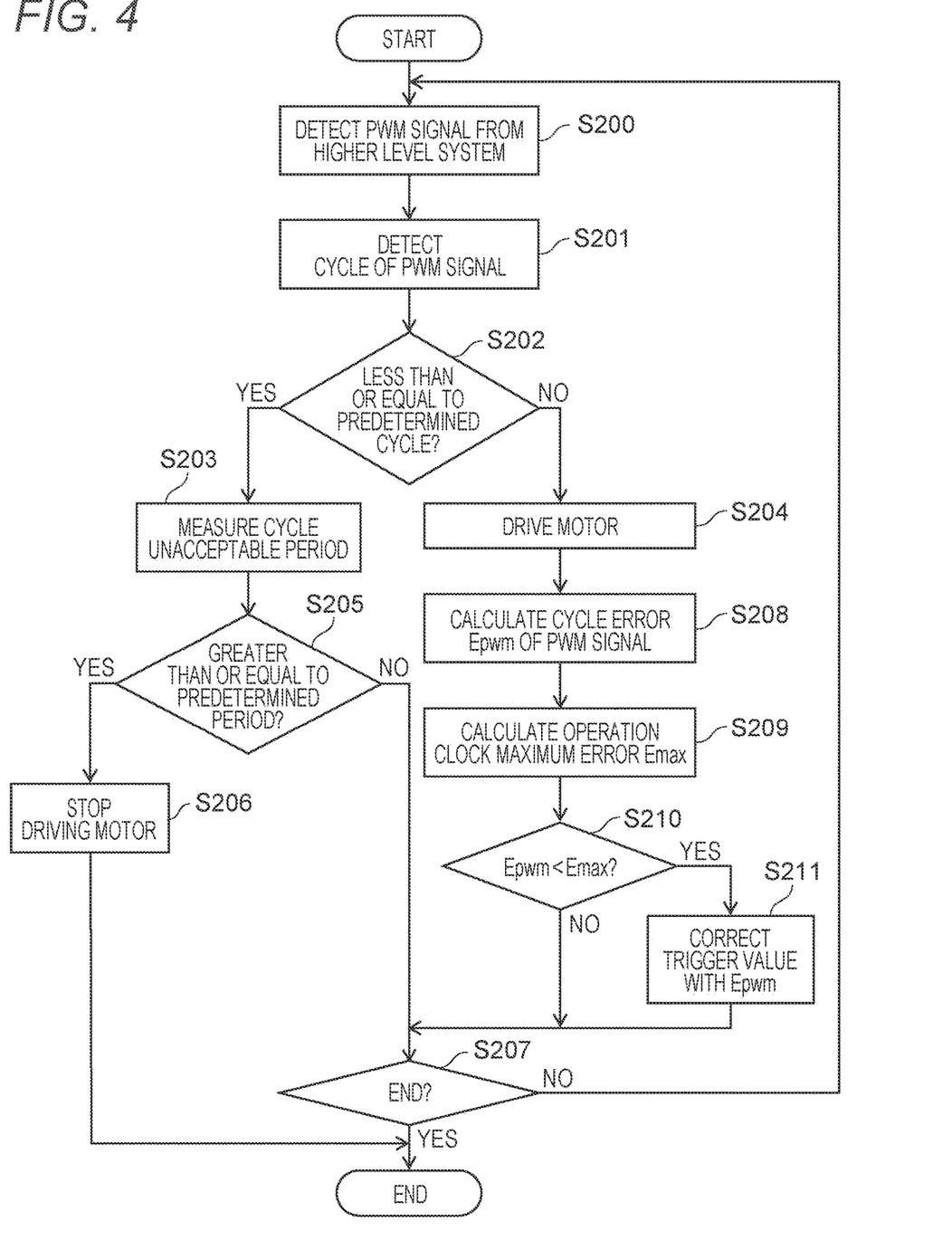
FIG. 4 is a flowchart illustrating an example of a procedure of operation of the motor driver according to the exemplary embodiment.

FIG. 4 is a flowchart illustrating an example of a procedure of an operation (that is, the motor drive process) of motor driver 40 according to the exemplary embodiment. The processing routine of this flowchart is repeatedly executed every first cycle (for example, 2 msec) of PWM signal Rr from higher level system 60 unless the motor driving is stopped due to an abnormality in the PWM cycle.

First, PWM signal detector 47 detects PWM signal Rr indicating the target rotation speed, which is repeatedly input from higher level system 60 in the first cycle, based on the clock generated by operation clock generator 46 (step S200). More specifically, PWM signal detector 47 counts the time widths of signal level High and signal level Low of PWM signal Rr input from higher level system 60 using clock signal Ck from operation clock generator 46.

Next, PWM cycle detector 48 detects the cycle of PWM signal Rr detected by PWM signal detector 47 (step S201). More specifically, cycle calculator 481 calculates the PWM cycle obtained by adding the time width of the high level, the time width of the low level, and both the time widths of PWM signal RT based on the count value from PWM signal detector 47. Filter 482 performs processing of removing noise on the PWM cycle calculated by cycle calculator 481, and then outputs the PWM cycle as PWM cycle Hf. Cycle range determination unit 483 determines whether PWM cycle Hf is at a noise level, and outputs the determination result as acceptable/unacceptable signal Jz.

In order to determine whether PWM cycle Hf is at a noise level, cycle range determination unit 483 determines whether PWM cycle Hf is equal to or less than a predetermined cycle (step S202). Cycle range determination unit 483 outputs the determination result as acceptable/unacceptable signal Jz.

As a result, when it is determined that PWM cycle Hf is equal to or less than the predetermined cycle ("Yes" in step S202), overall controller 56 determines that noise has been detected (unacceptable), and measures a cycle unacceptable period, that is, a period during which it is determined that noise has been detected (step S203). Overall controller 56 determines whether or not the measured cycle unacceptable period is a predetermined period or longer (step S205).

As a result, when the measured cycle unacceptable period is equal to or longer than the predetermined period ("Yes" in step S205), overall controller 56 recognizes that an abnormality has occurred and stops driving of the motor (step S206). Then, the motor drive process ends. On the other hand, when the measured cycle unacceptable period is not equal to or longer than the predetermined period ("NO" in step S205), overall controller 56 determines the end of the motor drive process (step S207).

In the end determination of the motor drive process (step S207), overall controller 56 repeats the motor drive process (to step S200) in a case where the end of the process is not commanded from higher level system 60 or the like ("No" in step S207), and ends the motor drive process in a case where the end is commanded ("Yes" in step S207).

In step S202, when it is determined that PWM cycle Hf detected by PWM cycle detector 48 is not equal to or less than the predetermined cycle ("NO" in step S202), overall controller 56 recognizes that no noise is detected, and drives the motor. That is, when motor 10 is in the stopped state, the rotation operation of motor 10 is started (step S204).

PWM cycle error calculator 50 calculates a cycle error Epwm indicating a degree of a difference between a predetermined cycle (Here, the first cycle which is an ideal cycle of PWM signal Rr output from higher level system 60) and PWM cycle Hf (step S208). Specifically, PWM cycle error calculator 50 calculates and outputs the error ratio (that is, PWM cycle Hf/first cycle) as cycle error Epwm.

Operation clock temperature-maximum error table 51 acquires the ambient temperature from temperature sensor 511. Operation clock temperature-maximum error table 51 derives maximum error Emax of the operation clock provided in motor 10 at the acquired ambient temperature (step S209).

PWM cycle error determination unit 52 compares maximum error Emax of the operation clock acquired from operation clock temperature-maximum error table 51 with cycle error Epwm of PWM signal Rr calculated by PWM cycle error calculator 50 (step S210). PWM cycle error determination unit 52 outputs error determination signal Je indicating the result.

As a result, when error determination signal Je indicates that cycle error Epwm of PWM signal Rr is smaller than maximum error Emax of the operation clock ("Yes" in step S210), trigger value calculator 53 determines that cycle error Epwm is within the correctable range. Trigger value calculator 53 corrects the cycle (trigger value) when trigger signal Trg is repeatedly generated from timer 54 using cycle error Epwm (step S211). More specifically, trigger value calculator 53 calculates the second cycle, which is a cycle when trigger signal Trg is repeatedly generated, using cycle error Epwm. Trigger value calculator 53 outputs trigger value signal Trv indicating the calculated second cycle to timer 54. Specifically, as the calculation of the second cycle, trigger value calculator 53 calculates the second cycle by multiplying the fixed reference value, that is, the reference value of the preset count value (trigger value) corresponding to the ideal state in which no error occurs in clock signal Ck from operation clock generator 46 by the error ratio indicated by cycle error Epwm.

Timer 54 counts clock signal Ck of operation clock generator 46, and repeats outputting trigger signal Trg for starting the interruption processing by rotation speed controller 41 at a time point when the obtained count value reaches the second cycle indicated by trigger value signal Trv from trigger value calculator 53.

On the other hand, when error determination signal Je does not indicate that cycle error Epwm of PWM signal Rr is smaller than maximum error Emax of the operation clock ("NO" in step S210), trigger value calculator 53 determines that the clock abnormality occurs in higher level system 60 that has generated and output PWM signal Rr. Then, trigger value calculator 53 does not correct the trigger value using cycle error Epwm.

Thereafter, an end determination process (step S207) of the motor drive process is performed.

Figure 5:
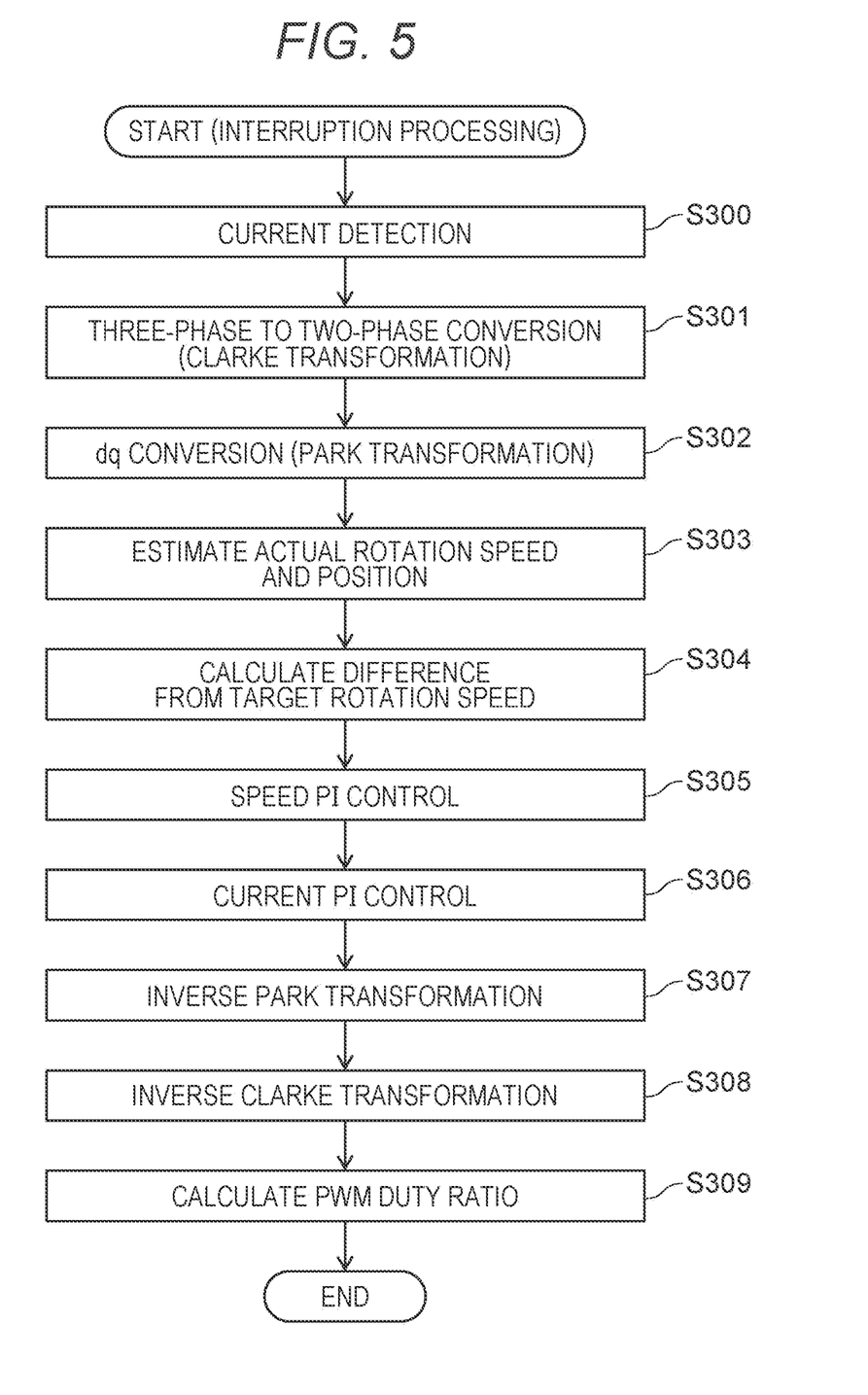
FIG. 5 is a flowchart illustrating an example of a procedure of interruption processing in the motor driver according to the exemplary embodiment.

FIG. 5 is a flowchart illustrating an example of a procedure of interruption processing in motor driver 40 according to the exemplary embodiment. That is, as the interruption processing executed every time trigger signal Trg is output from timer 54, the processes in rotation speed controller 41 and PWM circuit 43 are illustrated.

First, three-phase current detector 42a detects a current flowing through each of U-phase winding 16U. V-phase winding 16V, and W-phase winding 16W (step S300). Next, three-phase to two-phase converter 42b converts (that is, Clarke transformation) U-phase, V-phase, and W-phase three-phase current signals Li. Vi, and Wi detected by three-phase current detector 42a into two-phase current signals αi and βi in the orthogonal coordinate system (step S301). d/q axis converter 42c converts (that is, the Park transformation) two-phase current signals αi and βi from three-phase to two-phase converter 42b into current signals di and qi in the rotating coordinate system (step S302).

Actual rotation speed and position estimator 42d calculates the actual rotation speed of motor 10 from current signals di and qi from d/q axis converter 42c (step S303). The actual rotation speed calculated here is a rotation angle (that is, rotation angle/unit time) having a cycle (second cycle) of trigger signal Trg repeatedly generated from timer 54 as a unit time.

Next, differentiator 42e calculates a difference between the actual rotation speed indicated by actual rotation speed and position signal Ro from actual rotation speed and position estimator 42d and the target rotation speed indicated by command signal Tv from target rotation speed converter 55 (step S304). Speed PI controller 42f calculates current signals di_req and qi_req in the rotating coordinate system for PI control (control by proportional operation and integral operation) of the speed of motor 10 so that the difference calculated by differentiator 42e approaches 0 (step S305). Current PI controller 42g converts current signals di_req and qi_req from speed PI controller 42f into voltage signals dv_req and qv_req (step S306).

Inverse d/q converter 42h converts voltage signals dv_req and qv_req from current PI controller 42g into two-phase signals in an orthogonal coordinate system by performing inverse Park transformation (step S307). Three-phase modulator 42i performs inverse Clarke transformation on the two-phase signal from inverse d/q converter 42h to convert the two-phase signal into a three-phase waveform signal Wd (step S308). PWM circuit 43 calculates a PWM duty ratio, that is, performs pulse width modulation (PWM) using three-phase waveform signal Wd from three-phase modulator 42i as a modulation signal, thereby generating three-phase driving PWM signal Pd (step S309).

The PWM duty ratio calculated by PWM circuit 43 is updated in synchronization with next trigger signal Trg output from timer 54. That is, in parallel with the start of the next interruption processing, inverter 44 converts the DC voltage into three-phase AC voltages Uo, Vo, and Wo according to three-phase driving PWM signal Pd corresponding to the PWM duty ratio calculated by PWM circuit 43, and applies the DC voltages to windings 16U, 16V, and 16W, respectively.

By the above interruption processing (steps S300 to S309), feedback control is performed to drive motor 10 so that the actual rotation speed detected with the cycle (second cycle) of trigger signal Trg repeatedly generated from timer 54 as a unit time coincides with the target rotation speed indicated by command signal Tv. Here, the cycle (second cycle) of trigger signal Trg is an accurate cycle after the inaccuracy of clock signal Ck from operation clock generator 46 is corrected with the cycle of the high-accuracy PWM signal Rr supplied from higher level system 60. Therefore, the interruption processing is executed in an accurate cycle based on the highly accurate clock frequency of higher level system 60, and the unit time (interruption cycle) approaches the ideal value, so that the error of the actual rotation speed (=rotation angle/unit time) that is the rotation angle detected in the unit time is reduced.

Furthermore, in motor driver 40, cycle error Epwm calculated by PWM cycle error calculator 50 is used to multiply a fixed reference value by trigger value calculator 53. Therefore, it is avoided to multiply the variation value by the variation value as in PTL 1. As a result, the error of the actual rotation speed detected by rotation speed controller 41 can be reliably suppressed.

Figure 6A:
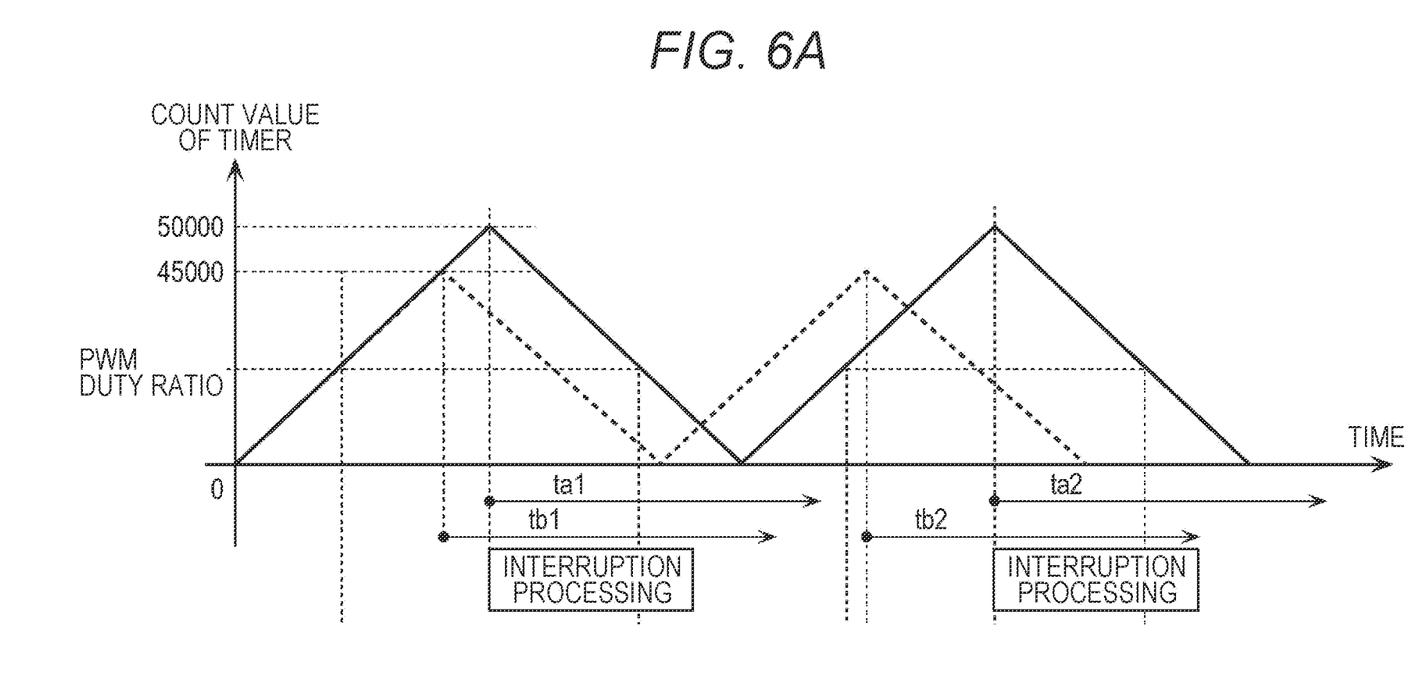
FIG. 6A is a timing chart illustrating an operation example of the motor driver according to the exemplary embodiment.
Figure 6B:
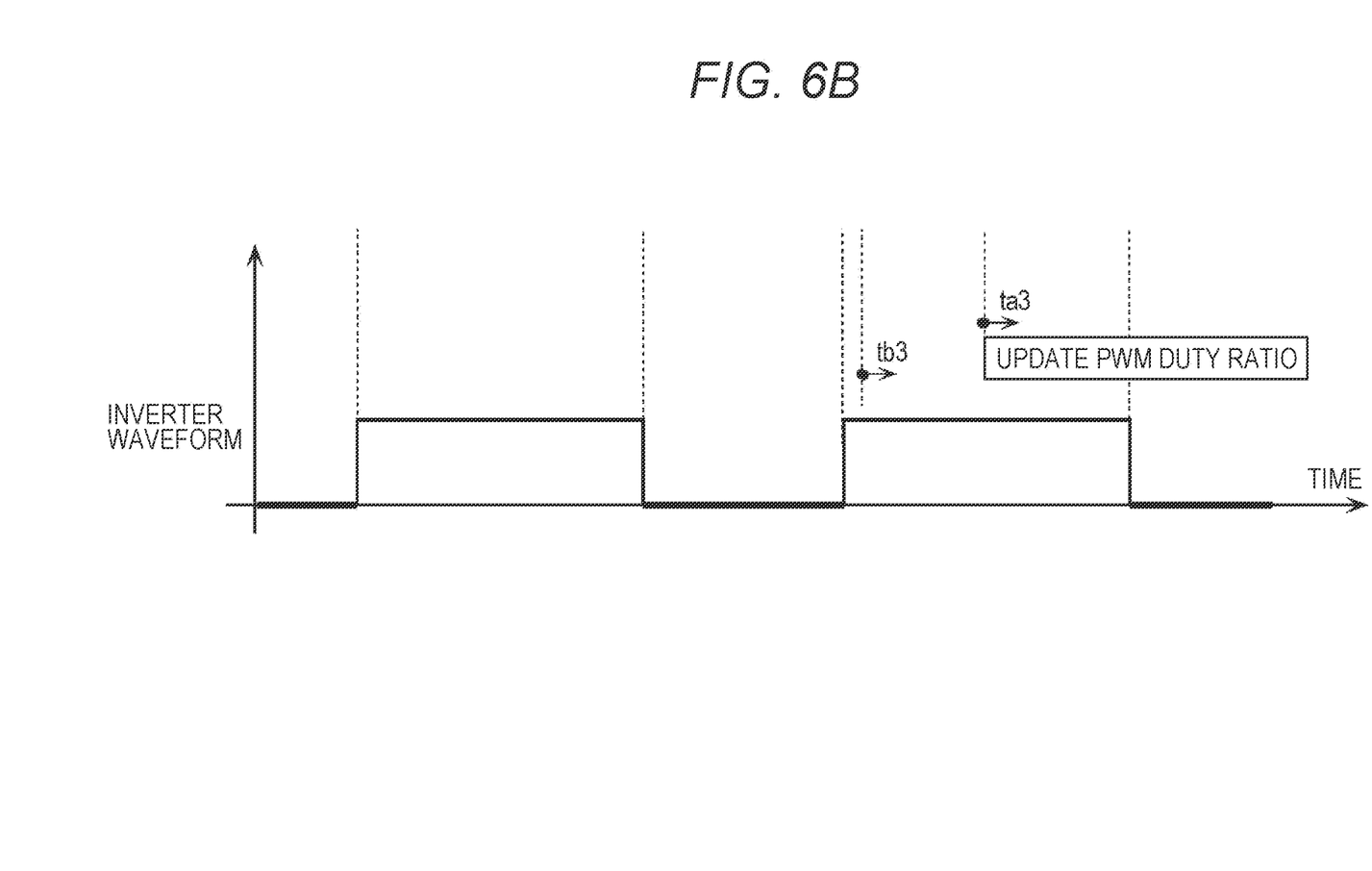
FIG. 6B is a timing chart illustrating an operation example of the motor driver according to the exemplary embodiment.

FIGS. 6A and 6B are timing charts illustrating exemplary operation of motor driver according to the exemplary embodiment. More specifically, FIG. 6A illustrates a time change example of the count value of timer 54. A solid line indicates a time change example in an ideal state, that is, in a case where no error occurs in clock signal Ck from operation clock generator 46. A broken line indicates a time change example in a case where an error occurs in clock signal Ck from operation clock generator 46 (error occurrence state). A lower part of FIG. 6A illustrates a timing (times ta1 and ta2 in the ideal state, and times tb1 and tb2 in the error occurrence state) at which the interruption processing (the process illustrated in FIG. 5) is executed. FIG. 6B illustrates waveform examples ("inverter waveforms") of three-phase AC voltages Uo, Vo, and Wo output from inverter 44 in the ideal state and the error occurrence state. FIG. 6B illustrates timing (time ta1 in the ideal state, and time tb3 in the error occurrence state) at which the "PWM duty ratio update process" (process by inverter 44) is executed.

Now, assuming that the trigger value (preset count value of timer 54) is 50,000 in the ideal state, in the ideal state, as indicated by a solid line in FIG. 6A, the interruption processing is performed every time timer 54 reaches 50,000 in the up/down count. This cycle corresponds to 5 seconds (=1/20 kHz×50,000×2) in a case where operation clock generator 46 outputs clock signal Ck of 20 kHz. Therefore, in the interruption processing, rotation speed controller 41 calculates the rotation angle (that is, rotation angle/5 seconds) generated in motor 10 in the period of 5 seconds as the actual rotation speed, and performs the rotation speed control.

On the other hand, when the error occurrence state occurs and operation clock generator 46 is in the state of outputting clock signal Ck of 18 kHz, the error ratio 0.9 (=18 kHz/20 kHz) is output from PWM cycle error calculator 50 as cycle error Epwm by using the first cycle of PWM signal Rr based on the high-accuracy clock of higher level system 60. As a result, trigger value calculator 53 outputs trigger value signal Trv indicating 45000 obtained by multiplying the trigger value (50,000) in the ideal state, which is a fixed reference value, by the error ratio 0.9 to timer 54.

As a result, as indicated by a broken line in FIG. 6A, the interruption processing is performed every time timer 54 reaches 45000 in the up/down count. This cycle also corresponds to 5 seconds (=1/18 kHz×45000×2) in the error occurrence state in which operation clock generator 46 outputs clock signal Ck of 18 kHz. Therefore, even in the error occurrence state, in the interruption processing, the rotation angle (that is, rotation angle/5 seconds) generated in motor 10 in the period of 5 seconds is calculated as the actual rotation speed by rotation speed controller 41, and the highly accurate rotation speed control similar to that in the ideal state is performed. That is, even when operation clock generator 46 is in the error occurrence state, rotation speed control is performed with high clock accuracy similar to that of higher level system 60 by using the high-accuracy clock of higher level system 60.

Furthermore, in motor driver 40, cycle error Epwm calculated by P cycle error calculator 50 is used to multiply a fixed reference value by trigger value calculator 53. As a result, it is avoided to multiply the variation value by the variation value as in PTL 1. Therefore, the error of the actual rotation speed detected by rotation speed controller 41 can be reliably suppressed.

As described above, motor driver 40 according to the present exemplary embodiment is a motor driver that rotates motor 10 at a target rotation speed, and includes operation clock generator 46 that generates a clock, PWM signal detector 47 that detects a, pulse width modulation signal indicating the target rotation speed, which is repeatedly input from the outside in a first cycle, based on the clock generated by operation clock generator 46, target rotation speed converter 55 that converts a duty ratio of the pulse width modulation signal detected by PWM signal detector 47 into a target rotation speed, rotation speed controller 41 that calculates an actual rotation speed of motor 10 by detecting a state related to rotation of motor 10, and drives motor 10 such that the calculated actual rotation speed matches the target rotation speed converted by target rotation speed converter 55, PWM cycle detector 48 that detects a cycle of a pulse width modulation signal detected by PWM signal detector 47, PWM cycle error calculator 50 that calculates a difference between the cycle detected by PWM cycle detector 48 and a first cycle, trigger value calculator 53 that calculates a second cycle when a trigger signal is repeatedly generated based on the difference calculated by PWM cycle error calculator 50, and timer 54 that generates a trigger signal in the second cycle calculated by trigger value calculator 53. Rotation speed controller 41 calculates an actual rotation speed depending on the second cycle of the trigger signal generated by timer 54.

As a result, the trigger signal is generated from timer 54 in the second cycle based on the difference between the cycle (first cycle) of the PWM signal repeatedly input from the outside and the cycle of the PWM signal detected depending on the clock from operation clock generator 46, and the rotation speed control by rotation speed controller 41 is executed. Therefore, in a case where there is an error in the frequency of the clock generated by operation clock generator 46, processing of offsetting the error is performed, and the second cycle in which the trigger signal is generated coincides with the first cycle. That is, the error of the clock frequency of operation clock generator 46 is reduced by using the highly accurate first cycle. This enables accurate rotation speed control. Therefore, operation clock generator 46 does not need to be a highly accurate clock generation circuit using a crystal oscillator or the like, and can be realized by a simple circuit.

In motor driver 40 according to the present exemplary embodiment, cycle error Epwm calculated by PWM cycle error calculator 50 is used for multiplying a fixed reference value by trigger value calculator 53. Therefore, it is avoided to multiply the variation value by the variation value as in PTL 1. As a result, the error of the actual rotation speed detected by rotation speed controller 41 can be reliably suppressed.

Such a feature of motor driver 40 in the present exemplary embodiment can reduce a clock trimming process for operation clock generator 46 before motor driver 40 is manufactured and shipped. In addition, individual variations of the switching frequency of inverter 44 are reduced, and the absolute accuracy is improved. Therefore, individual variation in temperature rise is suppressed, and a margin of a cooling area and a motor size of the cooling fin and the like can be reduced. In the evaluation of the emission (EMI, emission) in EMC (Electromagnetic compatibility, electromagnetic compatibility), individual variations are reduced, and the number of countermeasure components can be reduced.

Here, rotation speed controller 41 calculates the rotation angle of motor 10 in the second cycle of the trigger signal generated by timer 54 as the actual rotation speed. As a result, the rotation angle of motor 10 in the period of the second cycle that coincides with the highly accurate first cycle is calculated as the actual rotation speed. Therefore, the rotation speed control with high accuracy in which the error of the clock frequency of operation clock generator 46 is reliably suppressed is performed.

In addition, rotation speed controller 41 calculates the actual rotation speed in the interruption processing started with the trigger signal generated by timer 54 as a trigger. As a result, the rotation speed control by rotation speed controller 41 is reliably executed as an interruption processing without delay using the trigger signal generated by timer 54 as a trigger.

Furthermore, motor 10 according to the present exemplary embodiment is a motor including motor driver 40 and stator 11 to which a drive current is supplied based on a result calculated by motor driver 40. As a result, motor 10 including motor driver 40 capable of reliably suppressing the error of the actual rotation speed to be detected despite including operation clock generator 46 with low accuracy is realized.

Although the motor driver and the motor of the present disclosure have been described above based on the exemplary embodiments, the present disclosure is not limited to the exemplary embodiments. The present exemplary embodiment to which various modifications conceivable by those skilled in the art are applied, or another form constructed by combining some components in the exemplary embodiment is also included in the scope of the present disclosure without departing from the gist of the present disclosure.

For example, the present disclosure may be realized as an invention related to a motor driving method corresponding to all or a part of the processing illustrated in the flowcharts of FIGS. 4 and 5, or may be realized as an invention related to a program stored in a non-transitory computer-readable recording medium such as a digital versatile disc (DVD) that executes the motor driving method.

Further, in the above exemplary embodiment, the trigger signal from timer 54 is used to start the interruption processing by rotation speed controller 41 with respect to overall controller 56, but the present disclosure is not necessarily limited to such an application. The trigger signal from timer 54 may be used as a control signal for directly activating the rotation speed control by rotation speed controller 41.

Furthermore, in the above-described exemplary embodiment, rotation speed controller 41 that executes the interruption processing has a configuration separate from overall controller 56 realized by the program and the processor. However, it may be incorporated in overall controller 56 as a part of the function of overall controller 56. In the above exemplary embodiment, timer 54 is an up/down counter circuit.

However, the present disclosure is not limited thereto, and may be an up counter circuit or a down counter circuit.

Furthermore, in the above-described exemplary embodiment, the interruption processing is the process illustrated in the flowchart illustrated in FIG. 5, but the present disclosure is not limited thereto. If the processes up to the calculation of the actual rotation speed (steps S300 to S303) are executed by the interruption processing, the subsequent processes (step S304 and thereafter) may be processes executed asynchronously separately from the interruption processing.

The motor driver and the motor of the present disclosure can suppress a rotation speed shift and can achieve a stable rotation speed even when accuracy of an operation clock deteriorates due to heat generation or the like during energization drive. Therefore, the present disclosure is useful for a motor used in an electric device. In particular, the present disclosure is preferably used for in-vehicle use in which temperature fluctuation is severe.

The invention claimed is:

1. A motor driver that rotates a motor at a target rotation speed, the motor driver comprising:
 an operation clock generator that generates a clock;
 a pulse width modulation (PWM) signal detector that detects a pulse width modulation signal indicating the target rotation speed, the pulse width modulation signal being repeatedly input from an outside in a first cycle, based on the clock generated by the operation clock generator;
 a target rotation speed converter that converts a duty ratio of the pulse width modulation signal detected by the PWM signal detector into a target rotation speed;
 a rotation speed controller that calculates an actual rotation speed of the motor by detecting a state related to rotation of the motor, and drives the motor to cause the calculated actual rotation speed to match the target rotation speed converted by the target rotation speed converter;
 a PWM cycle detector that detects a cycle of the pulse width modulation signal detected by the PWM signal detector;
 a PWM cycle error calculator that calculates a difference between the cycle detected by the PWM cycle detector and the first cycle;
 a trigger value calculator that calculates a second cycle when a trigger signal is repeatedly generated based on the difference calculated by the PWM cycle error calculator; and
 a timer that generates the trigger signal in the second cycle calculated by the trigger value calculator,
 wherein the rotation speed controller calculates the actual rotation speed depending on the second cycle of the trigger signal generated by the timer.

2. The motor driver according to claim 1, wherein the rotation speed controller calculates a rotation angle of the motor in the second cycle of the trigger signal generated by the timer as the actual rotation speed.

3. The motor driver according to claim 2, wherein the rotation speed controller calculates the actual rotation speed in interruption processing started with the trigger signal generated by the timer as a trigger.

4. A motor comprising:
 the motor driver according to claim 1; and
 a stator to which a drive current is supplied based on a result calculated by the motor driver.

* * * * *